United States Patent
Yang

(10) Patent No.: US 8,117,721 B2
(45) Date of Patent: Feb. 21, 2012

(54) SNAP HOOK HAVING PIVOTAL LOCK

(75) Inventor: Kai Chieh Yang, Changhua (TW)

(73) Assignee: Gimmal Co., Ltd., Changhua (TW)

( * ) Notice: Subject to any disclaimer, the term of this patent is extended or adjusted under 35 U.S.C. 154(b) by 286 days.

(21) Appl. No.: 12/592,088

(22) Filed: Nov. 19, 2009

(65) Prior Publication Data

US 2011/0113603 A1    May 19, 2011

(51) Int. Cl.
*F16B 45/02* (2006.01)
*A44B 13/00* (2006.01)

(52) U.S. Cl. .................. 24/599.5; 24/599.9; 24/600.1

(58) Field of Classification Search .................. 24/600.1, 24/600.2, 599.6, 599.5, 599.4, 599.9, 600.8; 294/82.2, 82.22, 82.19, 82.17
See application file for complete search history.

(56) References Cited

U.S. PATENT DOCUMENTS

| | | | | |
|---|---|---|---|---|
| 944,546 A * | 12/1909 | Doering | ......................... | 24/599.5 |
| 1,489,509 A * | 4/1924 | Roberts | ....................... | 294/82.19 |
| 1,985,596 A * | 12/1934 | Burnham | ..................... | 294/82.2 |
| 3,798,716 A * | 3/1974 | Klein | .......................... | 24/599.3 |
| 3,920,265 A * | 11/1975 | Nilsson | .......................... | 297/483 |
| 4,062,092 A * | 12/1977 | Tamada et al. | ................ | 24/599.4 |
| 4,440,432 A | 4/1984 | Goris | | |
| 4,539,732 A | 9/1985 | Wolner | | |
| 4,948,190 A * | 8/1990 | Lucas | ........................... | 294/82.2 |
| 5,020,843 A * | 6/1991 | Lucas | ........................ | 294/82.21 |
| 5,608,953 A | 3/1997 | Petzl et al. | | |
| 5,791,025 A | 8/1998 | Maurice et al. | | |
| 6,161,264 A | 12/2000 | Choate | | |
| 6,283,524 B1 * | 9/2001 | Simond | ........................ | 294/82.2 |
| 6,588,076 B1 | 7/2003 | Choate | | |
| 7,437,806 B2 * | 10/2008 | Lin | ............... | 24/599.5 |
| 8,001,663 B2 * | 8/2011 | Belcourt et al. | ............. | 24/599.5 |
| 2009/0049663 A1 * | 2/2009 | Hong | ............................ | 24/600.1 |
| 2011/0126386 A1 * | 6/2011 | Liang | ............................ | 24/599.5 |

* cited by examiner

*Primary Examiner* — Robert J Sandy
*Assistant Examiner* — Rowland D Do
(74) *Attorney, Agent, or Firm* — Charles E. Baxley

(57) ABSTRACT

A snap hook includes a channel and an orifice of different height formed in an attaching end of a hook member and a latching cavity formed in a receiving end of the hook member, a pivotal gate having one end attached to the attaching end with an axle, and a latch member attached to the other end for engaging with the latching cavity of the hook member, the axle includes one or more flat surfaces for engaging into the narrower channel of the hook member and for selectively moving the latch member to engage with the latching cavity of the hook member and to lock the pivotal gate to the hook member, and for preventing the pivotal gate from being unlocked or opened inadvertently.

8 Claims, 5 Drawing Sheets

SNAP HOOK HAVING PIVOTAL LOCK

BACKGROUND OF THE INVENTION

1. Field of the Invention

The present invention relates to a snap hook or S-hook or the like, and more particularly to a snap hook or S-hook including a pivotal safety locking member rotatably attached to a pivotal gate for solidly locking C-shaped hook body and for allowing the snap hook or S-hook to be easily operated by the user and for preventing the pivotal safety locking member from being unlocked or opened inadvertently.

2. Description of the Prior Art

Typical coupling devices or snap hooks comprise an elongated body member pivotally attached to a handle or loop and including a hook formation formed or provided on one end for engaging with a cable or other objects, and a latch pivotally attached to the handle or loop for selectively locking the hook formation and thus for stably anchoring or locking or securing the cable or other objects to the elongated body member.

For example, U.S. Pat. No. 4,440,432 to Goris, U.S. Pat. No. 4,539,732 to Wolner, and U.S. Pat. No. 6,161,264 to Choate disclose three of the typical swivel coupling devices each comprising a central elongate body member with a hook formation formed or provided on one end and a swivel ring at the other end, and a latch pivotally attached to the body member for selectively locking the hook formation and thus for stably anchoring or locking or securing the cable or other objects to the elongated body member.

However, the pivotal latch may be easily opened to unlock the hook formation and thus for allowing the cable or other objects to be easily disengaged from the elongated body member inadvertently.

U.S. Pat. No. 5,608,953 to Petzl et al. discloses another typical snap hook comprising a pivoting finger associated to a locking ring movable in rotation between a first locking position and a second unlocking position, and a locking bolt cooperates with the ring to selectively lock the ring positively in the first locking position.

However, the locking ring is rotatable relative to the pivoting finger and may not be moved longitudinally relative to the pivoting finger and thus may not be moved to solidly engage with a C-shaped metallic body.

U.S. Pat. No. 5,791,025 to Maurice et al. discloses a further typical snap hook comprising a pivoting finger with a rotary locking ring cooperating with a locking bolt, and the locking bolt includes an operating component designed to cooperate alternately with a notch arranged in the locking ring and movable in rotation between a first locking position and a second unlocking position.

However, similarly, the locking ring is rotatable relative to the pivoting finger and may not be moved longitudinally relative to the pivoting finger and thus may not be moved to solidly engage with a C-shaped metallic body.

U.S. Pat. No. 6,588,076 to Choate discloses a still further typical snap hook comprising a pivoting finger associated to a locking ring movable in rotation between a first locking position and a second unlocking position, and a locking bolt cooperates with the ring to selectively lock the ring positively in the first locking position.

However, the locking ring is rotatable relative to the pivoting finger and may not be moved longitudinally relative to the pivoting finger and thus may not be moved to solidly engage with a C-shaped metallic body.

The present invention has arisen to mitigate and/or obviate the afore-described disadvantages of the conventional snap hooks or S-hooks.

SUMMARY OF THE INVENTION

The primary objective of the present invention is to provide a snap hook including a pivotal safety locking member rotatably attached to a pivotal gate and movable to engage with one end of a C-shaped hook body for solidly securing or locking the C-shaped hook body and for preventing the pivotal safety locking member from being unlocked or opened inadvertently.

In accordance with one aspect of the invention, there is provided a snap hook comprising a hook member including a space formed therein, and including a gap formed therein and communicating with the space of the hook member for forming an attaching end and a receiving end, the hook member including a channel and an orifice formed in the attaching end thereof and communicative with each other, the orifice of the hook member including an inner diameter greater than a height of the channel of the hook member and located farther away from the receiving end of the hook member than the channel of the hook member, and the hook member including a latching cavity formed in the receiving end thereof, a pivotal gate including a first end pivotally secured to the attaching end of the hook member with an axle for allowing the pivotal gate to be rotated relative to the hook member between a locking position and an unlocking position, the pivotal gate including a second end, and the axle being rotatably engaged through the orifice of the hook member, and a latch member attached to the second end of the pivotal gate for selectively engaging with the latching cavity of the hook member, and the axle includes at least one flat surface formed therein for allowing the axle to be selectively engaged into the channel of the hook member and to be moved toward or away from the receiving end of the hook member when the flat surface of the axle is parallel to the channel of the hook member, and the latch member is moveable to selectively engage with the latching cavity of the hook member and to anchor the pivotal gate to the hook member at the locking position when the axle is moved toward the receiving end of the hook member and for preventing the pivotal gate from being unlocked or opened inadvertently.

A lever arm is further provided and pivotally attached to the hook member with a pivot shaft and includes a first end pivotally coupled to the axle for moving the axle along the channel of the hook member and for moving the pivotal gate toward or away from the receiving end of the hook member and thus for actuating the latch member to engage with the latching cavity of the hook member.

The lever arm includes a middle portion pivotally attached to the hook member with the pivot shaft, and includes a hand grip provided on a second end thereof for moving the first end of the lever arm and the axle along the channel of the hook member. The lever arm includes a compartment formed therein for partially receiving the hook member.

A spring biasing member is further provided and engaged with the pivotal gate and the lever arm for forcing and biasing the axle to move along the channel of the hook member. The spring biasing member includes a loop for engaging with the axle and includes a first end engaged with the pivotal gate, and includes a second end engaged with the lever arm.

The pivotal gate includes a chamber formed therein for receiving the attaching end and the receiving end of the hook member. The hook member includes a notch formed in the receiving end thereof and communicative with the latching cavity of the hook member.

Further objectives and advantages of the present invention will become apparent from a careful reading of the detailed

DETAILED DESCRIPTION OF THE PREFERRED EMBODIMENT

Figure 1:
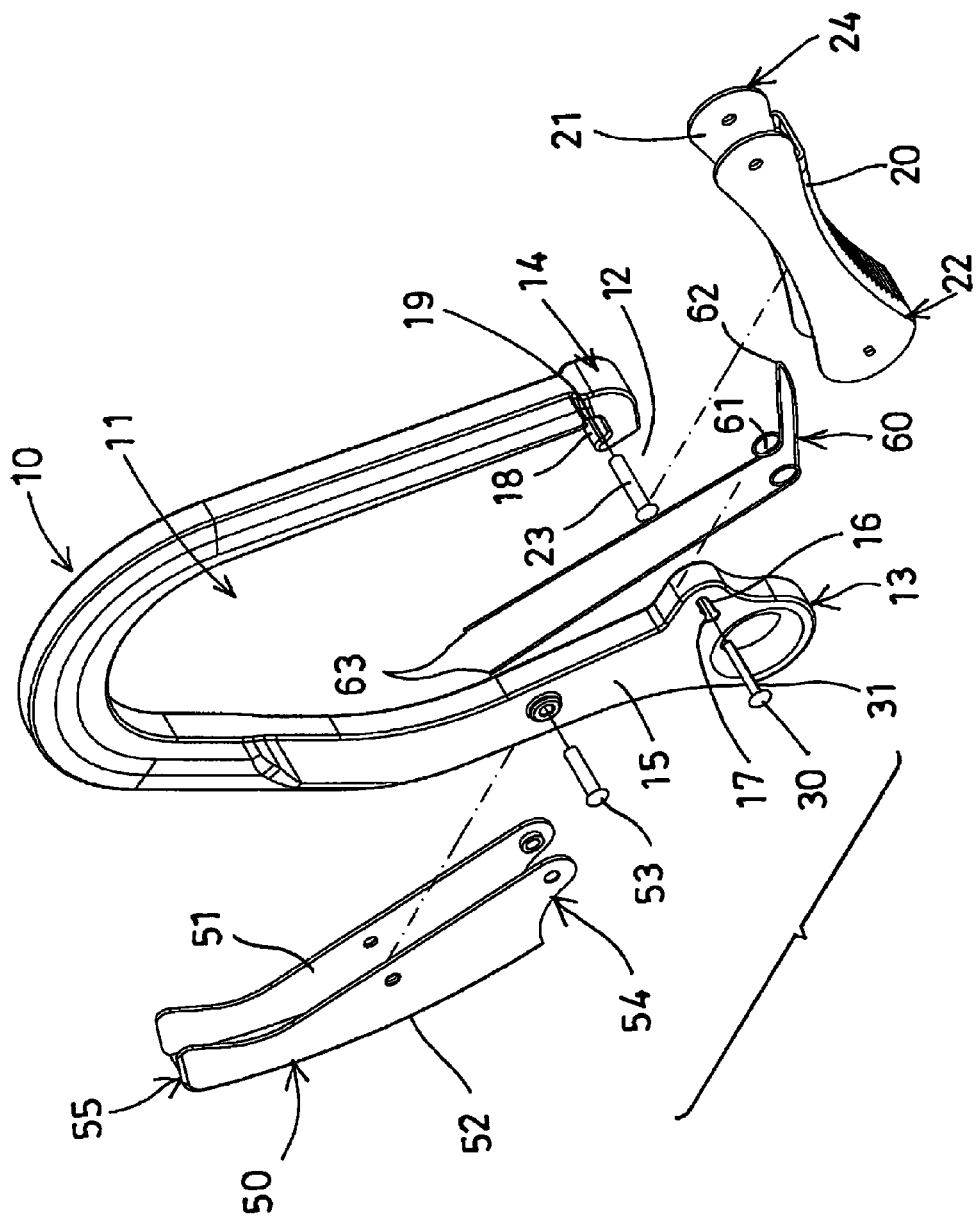
FIG. 1 is an exploded view of a snap hook in accordance with the present invention.
Figure 2:
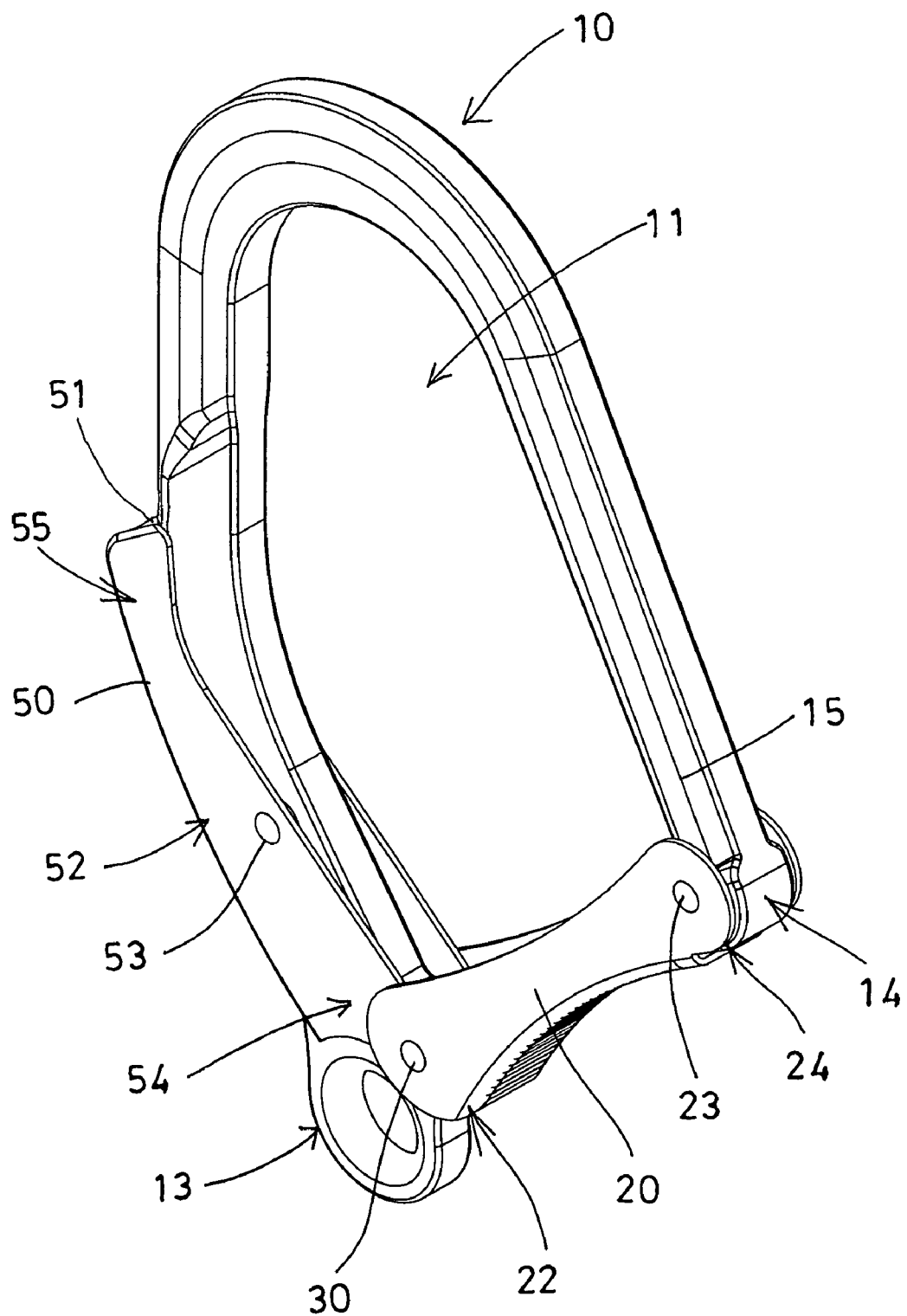
FIG. 2 is a perspective view of the snap hook.
Figure 3:
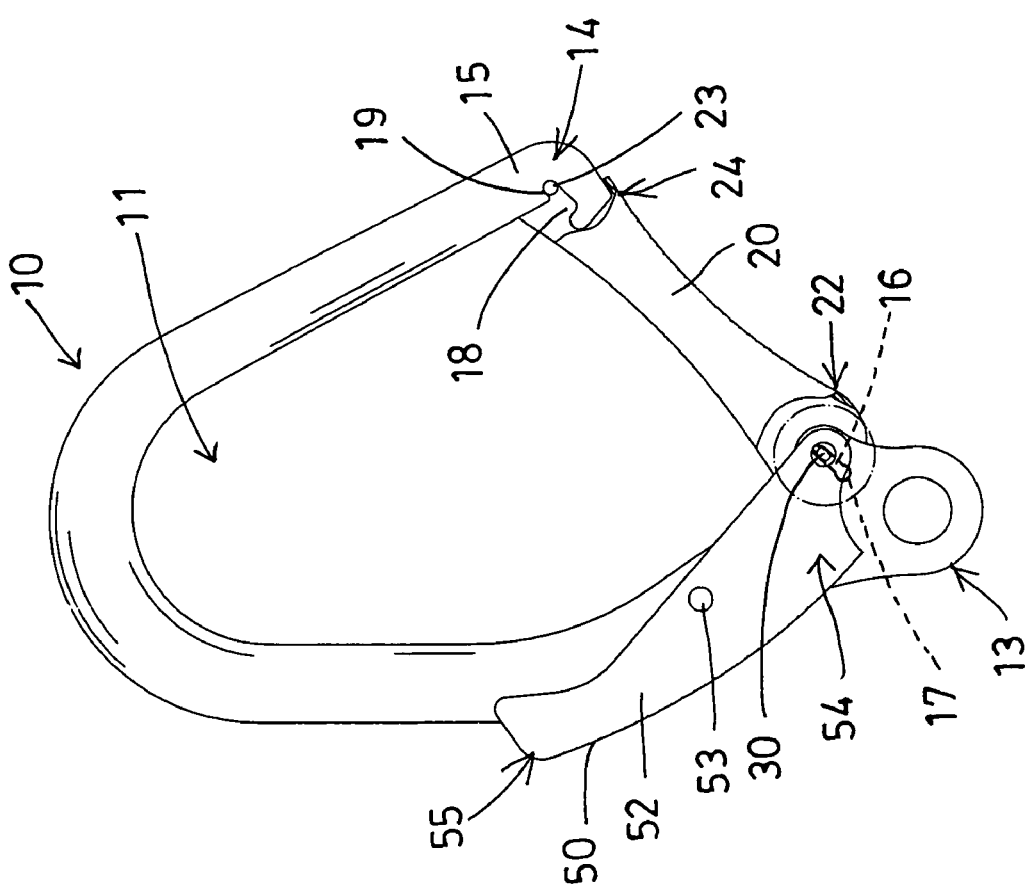
FIG. 3 is a plan schematic view of the snap hook.

Referring to the drawings, and initially to FIGS. 1-3, a snap hook in accordance with the present invention comprises a substantially C-shaped hook body or member 10 including a space 11 formed therein for receiving one or more cables (not shown) or other objects, and including a gap 12 formed therein (FIGS. 1, 6) and communicative with the space 11 thereof for forming or defining two free ends 13, 14, such as a first or attaching end 13 and a second or receiving end 14. It is preferable that the C-shaped hook member 10 is bent or formed with an elongated rod which includes a circular or substantially square cross section, and the hook member 10 includes one or more cut-off portions 15 formed in each of the free ends 13, 14 for forming a flat structure or a square or rectangular cross section for each of the free ends 13, 14 of the hook member 10.

The hook member 10 further includes a channel 16 and an orifice 17 formed in one end 13, such as formed in the attaching end 13 thereof, and communicative with each other, in which the orifice 17 of the hook member 10 includes an inner diameter greater than a thickness or depth or height of the channel 16 of the hook member 10, the orifice 17 of the hook member 10 is located farther away from the other or second or receiving end 14 of the hook member 10 than the channel 16 of the hook member 10, or the channel 16 of the hook member 10 is located closer to the other or second or receiving end 14 of the hook member 10 than the orifice 17 of the hook member 10, and the hook member 10 further includes a notch 18 and a latching cavity 19 formed in the other or second end 14, such as formed in the receiving end 14 thereof.

Figure 5:
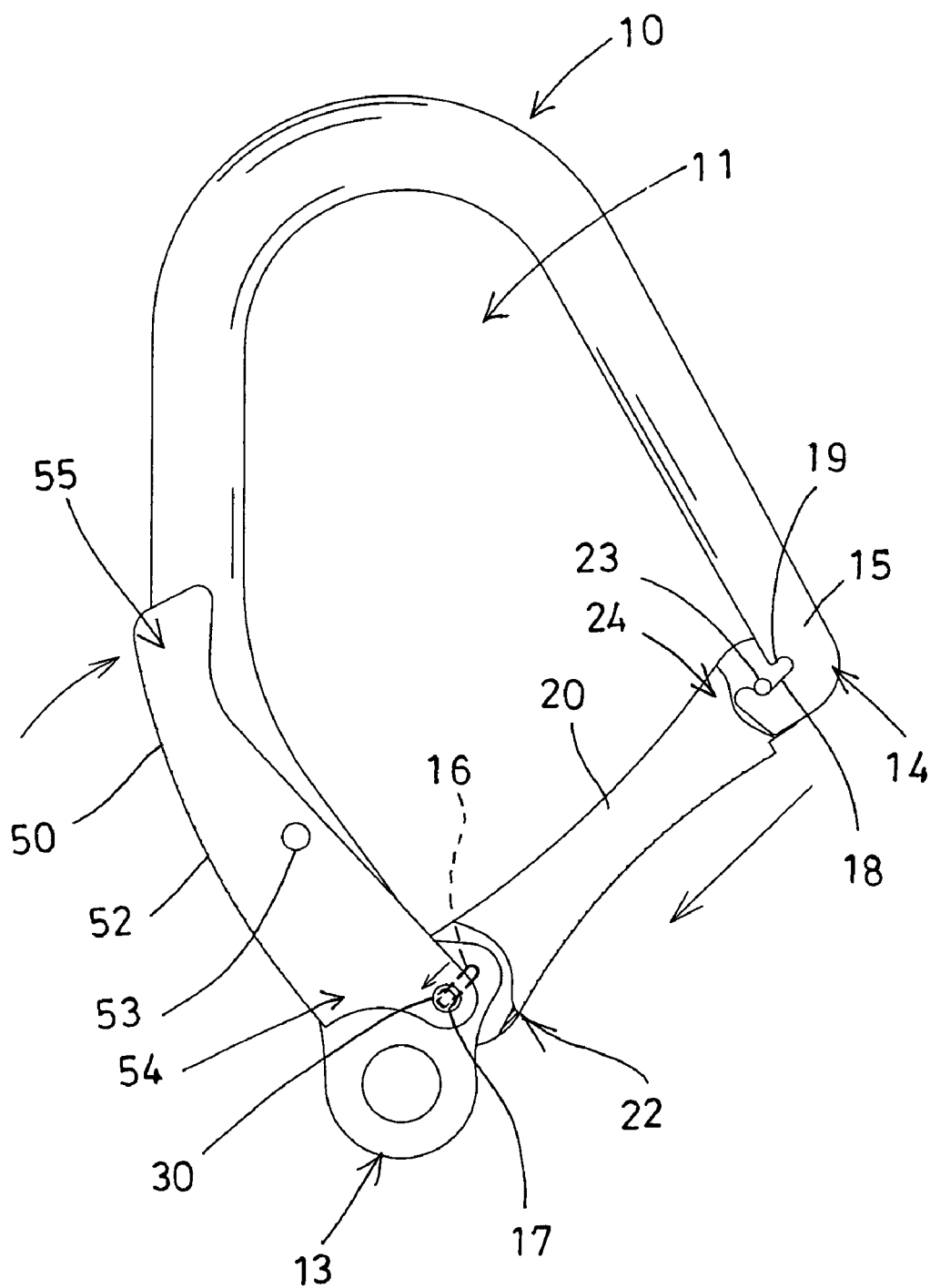
FIGS. 5 and 6 are plan schematic views similar to FIG. 3, illustrating the operation of the snap hook.
Figure 6:
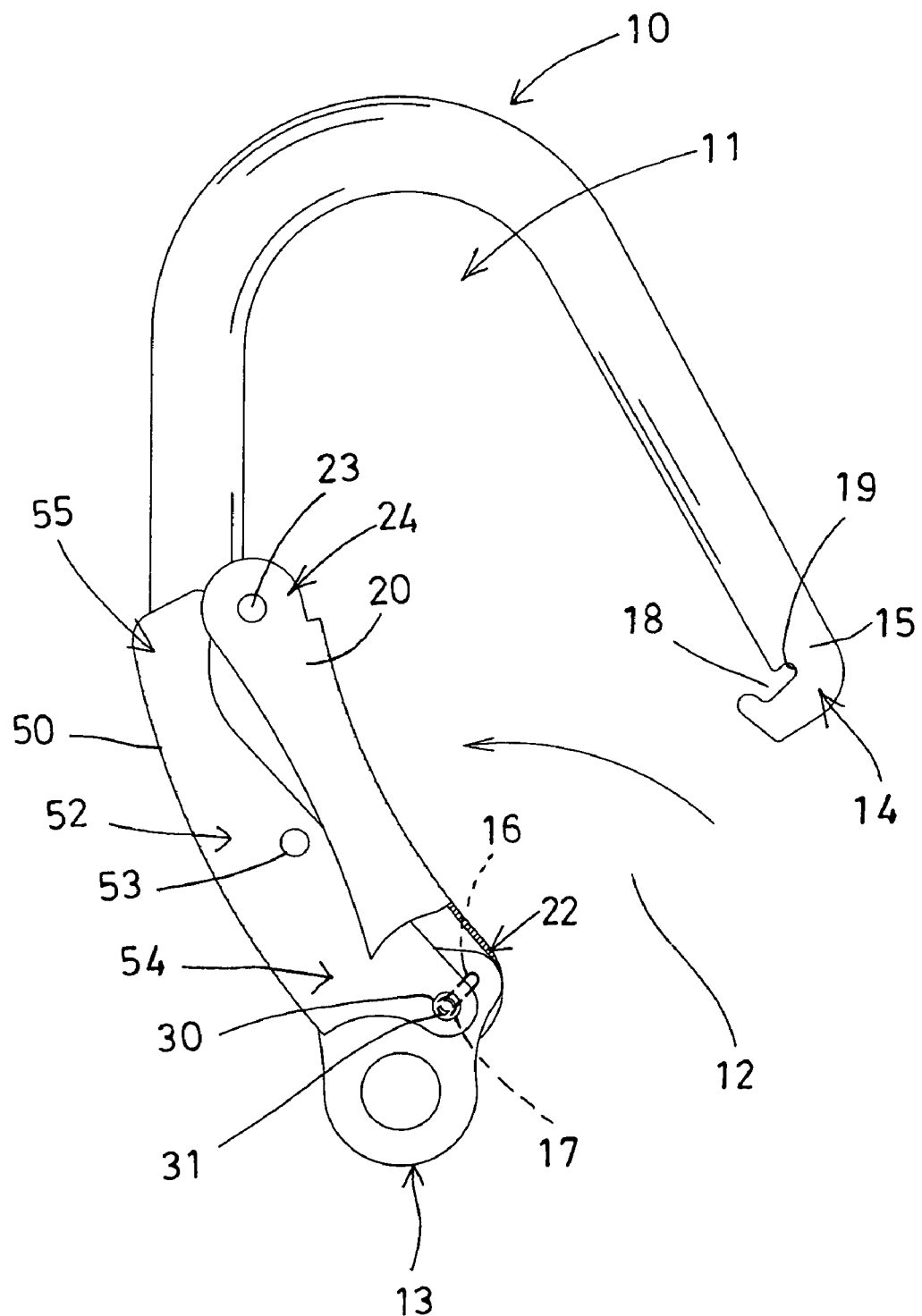

A pivotal shank or gate 20 includes a chamber 21 formed therein for receiving the attaching end 13 and/or the receiving end 14 of the hook member 10, an axle 30 is further provided and attached to the first end 22 of the pivotal gate 20 and engaged through the chamber 21 of the pivotal gate 20 and further rotatably engaged through the orifice 17 at the attaching end 13 of the hook member 10 for pivotally or rotatably attaching or securing the pivotal gate 20 to the hook member 10 and for allowing the pivotal gate 20 to be pivoted or rotated relative to the hook member 10 between a first locking position (FIGS. 2, 3, 5) and a second unlocking position (FIG. 6).

The axle 30 includes an outer diameter substantially equals to or slightly smaller than the inner diameter of the orifice 17 of the hook member 10, and greater than the thickness or depth or height of the channel 16 of the hook member 10 for allowing the axle 30 to be pivotally or rotatably attached or coupled to the attaching end 13 of the hook member 10, and the axle 30 includes one or more (such as two opposite) cut-off portions or flat surfaces 31 formed therein (FIGS. 1, 4) for allowing the axle 30 to be selectively received or engaged into the narrower channel 16 of the hook member 10 and to be moved toward or away from the other or second or receiving end 14 of the hook member 10 when the flat surfaces 31 of the axle 30 are aligned with or parallel to the narrower channel 16 of the hook member 10 (FIG. 4), the axle 30 may only be moved longitudinally along the narrower channel 16 of the hook member 10 when the flat surfaces 31 of the axle 30 are aligned with or parallel to the narrower channel 16 of the hook member 10.

The pivotal gate 20 further includes a catch rod or latch member 23 attached to or formed in the other or second or latching end 24 of the pivotal gate 20 for selectively engaging with the notch 18 and/or the latching cavity 19 of the hook member 10 (FIGS. 3, 5) and for anchoring or latching the pivotal gate 20 to the hook member 10 at the first locking position. For example, as shown in FIG. 5, when the axle 30 is rotatably engaged in the orifice 17 at the attaching end 13 of the hook member 10, the latch member 23 may be engaged with the notch 18 of the hook member 10, and the latch member 23 may be engaged into the latching cavity 19 of the hook member 10 (FIG. 3) when the axle 30 is slidably engaged into the narrower channel 16 of the hook member 10 (FIG. 4), in order to solidly lock and secure the pivotal gate 20 to the hook member 10 at the first locking position and to prevent the pivotal gate 20 from being rotated away from the hook member 10 to the second unlocking position.

A handle or lever arm 50 includes a compartment 51 formed therein for receiving a portion of the hook member 10, and includes a middle portion 52 pivotally or rotatably attached or coupled to the hook member 10 with a pivot shaft 53 for allowing the lever arm 50 to be pivoted or rotated relative to the hook member 10, and includes one or first end 54 pivotally coupled to the axle 30 for moving the axle 30 along the narrower channel 16 of the hook member 10 and for moving the pivotal gate 20 toward or away from the other or second or receiving end 14 of the hook member 10 and for actuating or forcing the latch member 23 to engage with the latching cavity 19 of the hook member 10, in order to solidly lock and secure the pivotal gate 20 to the hook member 10 at the first locking position. The channel 16 of the hook member 10 is curved having a center of curvature located at the pivot shaft 53.

Figure 4:
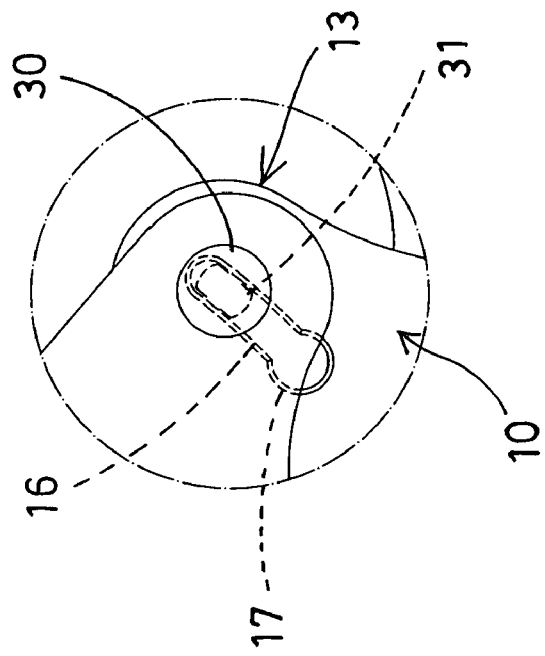
FIG. 4 is an enlarged partial plan schematic view of the snap hook.

In operation, as shown in FIGS. 3 and 4, the latch member 23 of the pivotal gate 20 may be forced or actuated or operated to engage with the latching cavity 19 of the hook member 10 by moving the other or second end or hand grip 55 of the lever arm 50 away from the hook member 10, in order to solidly lock and secure the pivotal gate 20 to the hook member 10 at the first locking position. As shown in FIG. 5, the latch member 23 of the pivotal gate 20 may be forced or actuated or operated or moved to be disengaged from the latching cavity 19 of the hook member 10 by moving or depressing the other or second end or hand grip 55 of the lever arm 50 toward the hook member 10, and to allow the pivotal gate 20 to be pivoted or rotated relative to the hook member 10 between the first locking position (FIGS. 2, 3, 5) and the second unlocking position (FIG. 6).

As shown in FIG. 1, a spring biasing member 60 may be provided and attached or engaged to the hook member 10, for example, the spring biasing member 60 includes one or more (such as two) rings or loops 61 formed or provided on the middle portion thereof for receiving or engaging with the axle 30 and for attaching the spring biasing member 60 to the hook member 10, and includes one or first end 62 for engaging with the pivotal gate 20 and for biasing or forcing the latch member 23 to engage with the notch 18 and/or the latching cavity 19 of the hook member 10, and includes the other or second end 63 for engaging with the lever arm 50 and for biasing or forcing the other or second end or hand grip 55 of the lever arm 50 away from the hook member 10.

It is to be noted that the latch member 23 of the pivotal gate 20 may be forced or actuated or operated to engage with the latching cavity 19 of the hook member 10 to prevent the pivotal gate 20 from being rotated away from the hook member 10 to the second unlocking position inadvertently, and the latch member 23 of the pivotal gate 20 is allowed to be pivoted or rotated relative to the hook member 10 between the first locking position and the second unlocking position when the latch member 23 of the pivotal gate 20 is disengaged from the latching cavity 19 of the hook member 10 for allowing the snap hook to be easily and quickly operated by the users.

Accordingly, the snap hook in accordance with the present invention includes a pivotal safety locking member rotatably attached to the pivotal gate and movable to engage with one end of the C-shaped hook body for solidly securing or locking the C-shaped hook body and for preventing the pivotal safety locking member from being unlocked or opened inadvertently.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A snap hook comprising:
   a hook member including a space formed therein, and including a gap formed therein and communicating with said space of said hook member for forming an attaching end and a receiving end, said hook member including a channel and an orifice formed in said attaching end thereof and communicative with each other, said orifice of said hook member including an inner diameter greater than a height of said channel of said hook member and located farther away from said receiving end of said hook member than said channel of said hook member, and said hook member including a latching cavity formed in said receiving end thereof,
   a pivotal gate including a first end pivotally secured to said attaching end of said hook member with an axle for allowing said pivotal gate to be rotated relative to said hook member between a locking position and an unlocking position, said pivotal gate including a second end, and said axle being rotatably engaged through said orifice of said hook member, and
   a latch member attached to said second end of said pivotal gate for selectively engaging with said latching cavity of said hook member, and
   said axle including at least one flat surface formed therein for allowing said axle to be selectively engaged into said channel of said hook member and to be moved toward or away from said receiving end of said hook member when said at least one flat surface of said axle is parallel to said channel of said hook member, and said latch member being moveable to selectively engage with said latching cavity of said hook member and to anchor said pivotal gate to said hook member at said locking position when said axle is moved toward said receiving end of said hook member.

2. The snap hook as claimed in claim 1, wherein a lever arm is pivotally attached to said hook member with a pivot shaft and includes a first end pivotally coupled to said axle for moving said axle along said channel of said hook member and for moving said pivotal gate toward or away from said receiving end of said hook member and for actuating said latch member to engage with said latching cavity of said hook member.

3. The snap hook as claimed in claim 2, wherein said lever arm includes a middle portion pivotally attached to said hook member with said pivot shaft, and includes a hand grip provided on a second end thereof for moving said first end of said lever arm and said axle along said channel of said hook member.

4. The snap hook as claimed in claim 2, wherein said lever arm includes a compartment formed therein for partially receiving said hook member.

5. The snap hook as claimed in claim 2, wherein a spring biasing member is engaged with said pivotal gate and said lever arm for forcing and biasing said axle to move along said channel of said hook member.

6. The snap hook as claimed in claim 5, wherein said spring biasing member includes a loop for engaging with the axle and includes a first end engaged with said pivotal gate, and includes a second end engaged with said lever arm.

7. The snap hook as claimed in claim 1, wherein said pivotal gate includes a chamber formed therein for receiving said attaching end and said receiving end of said hook member.

8. The snap hook as claimed in claim 1, wherein said hook member includes a notch formed in said receiving end thereof and communicative with said latching cavity of said hook member.

* * * * *